United States Patent Office 3,390,167
Patented June 25, 1968

3,390,167
PROCESS FOR THE PREPARATION OF 1-AMINO-2-ALKYLSULFURIC ACIDS
Howard S. Bender, Ridgefield, and Frederic C. Loew, Ridgewood, N.J., and Paul Resnick, Brooklyn, N.Y., assignors to Interchemical Corporation, Clifton, N.J.
No Drawing. Filed Mar. 30, 1965, Ser. No. 444,056
9 Claims. (Cl. 260—458)

ABSTRACT OF THE DISCLOSURE

A process for preparing 1-amino-2-alkylsulfuric acids by reacting a compound having the formula

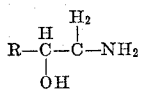

(R being an alkyl group having 1–6 carbon atoms) with liquid sulfur trioxide at a temperature between 0° and 15° C., in a liquid solvent.

---

The present invention is directed to processes for preparing β-aminoalkyl sulfates and is also directed to a novel hydroxypropylsulfamate.

Sulfuric acid has been utilized in a number of processes to co-react with a β-hydroxyalkylamine to prepare β-aminoalkyl sulfates. Such processes require the removal of by-product water. The various schemes for removing water are time consuming and usually expensive.

It is an object of this invention to provide processes for preparing β-aminoalkyl sulfates by processes which do not produce water as a synthesis byproduct. It is also an object of this invention to provide 2-hydroxypropylsulfamic acid as a novel compound. Other objects and advantages of the present invention will in part be obvious and will in part appear hereinafter.

The present invention contemplates the preparation of 1-amino-2-alkyl sulfates, and preferably the 1-amino-2-loweralkyl sulfates, by reacting sulfur trioxide with a 2-hydroxyalkylamine in a solvent. Of greatest immediate interest is the reaction of sulfur trioxide with isopropanolamine (2-hydroxypropylamine) to prepare 1-amino-2-propylsulfuric acid which, as disclosed in detail herein, is illustrative of the preparation of the β-aminoalkyl sulfates. The reaction product contains, in addition to the 1-amino-2-propylsulfuric acid, a by-product, 2-hydroxypropylsulfamic acid, which may be isomerized by heating to form 1-amino-2-propylsulfuric acid. The β-aminoalkyl sulfates have the formula

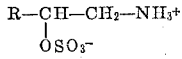

The term "sulfate" is used to include the corresponding sulfuric acid.

The process may be carried out by utilizing either a gaseous sulfur trioxide (generally monomeric) or liquid sulfur trioxide (generally trimeric). The process is preferably carried out by adding the sulfur trioxide slowly to the hydroxyalkylamine in solution at a temperature between −10° C. and 85° C. Generally relatively low temperatures, below about 15° C. are preferred.

The reaction solvents are those which are liquid under the reaction conditions and in which the aminoalcohol is soluble or dispersible. The solvent should not react with the reactants or products. For ease in recovery of product, it is preferable that it should not be soluble in the reaction solvent. Illustrative of the useful solvents are: methylene chloride, ethylene chloride, tetrachloroethylene, methylchloroform, trichloroethylene, mono-, di-, and trichlorobenzenes, 1,2,3-trichloropropane, chloroform, carbon tetrachloride, and equivalent fluro- and bromo-hydrocarbon solvents, nitrobenzene, nitrotoluene, dimethyl sulfate, and liquid sulfur dioxide. The chlorinated hydrocarbons generally are preferred, with methylene chloride, ethylene chloride, trichloroethylene, and tetrachloroethylene being especially preferred.

The reaction of sulfur trioxide and isopropanolamine is preferably carried out by slowly adding the sulfur trioxide to an agitated solution of isopropanolamine in methylene chloride maintained at a temperature between 0° C. and 15° C. Reaction of the sulfur trioxide and the amine is substantially stoichiometric. A precipitate is formed which contains crude 1-amino-2-propylsulfuric acid together with 2-hydroxypropylsulfamic acid.

The by-product 2-hydroxypropylsulfamic acid is isomerized to 1-amino-2-propylsulfuric acid by heating at a temperature of about 160° C. or above. The heating is preferably carried out in an inert liquid medium which is not a solvent, for the two isomers, e.g., hydrocarbon oil, mesitylene, etc. The purest products were obtained when using mesitylene. In production, the isomerization could be carried out in the solvent in which the crude 2-hydroxypropylsulfamic acid was prepared, without isolation of the crude product. This would require pressure in most cases.

2-hydroxypropylsulfamic acid is also synthesized by the low temperature reaction of isopropanolamine in aqueous solution with a pyridine-sulfur trioxide complex under highly alkaline conditions, to prepare the corresponding alkaline salt. This salt is easily converted to 2-hydroxypropylsulfamic acid by contacting it with an acid cationic exchange resin.

The 1-amino-2-alkyl sulfates are readily converted to the corresponding alkylenimine by heating an aqueous solution with sodium hydroxide. This procedure is used to convert 1-amino-2-propylsulfuric acid to propylenimine. The 2-hydroxypropylsulfamic acid is also converted to propylenimine after isomerization.

For the purpose of further explaining the invention to those skilled in the art, the following illustrative examples are given:

EXAMPLE 1

Reaction of isopropanolamine with liquid sulfur trioxide in methylene chloride

To a 3-neck, 3-liter flask fitted with a 3-way adapter, stirrer, pressure equalizing dropping funnel, condenser, and thermometer, was added 1 liter of methylene chloride and 75 g. (1 mole) of distilled isopropanolamine. To this mixture was added slowly with cooling (5–15° C.) 83 g. (1.035 moles) of liquid sulfur trioxide. The addition took 2½ hours. The white precipitate was stirred for 30 minutes and filtered. The precipitate was extremely gelatinous and hard to filter. The filter cake was air dried overnight and then oven dried for 24 hours at 80° C. The infrared spectrum was identical with that of known sample of 1-amino-2-propylsulfuric acid. The gelatinous solid was recrystallized from 20% aqueous acetone, M.P. 251–3°, yield after recrystallization 151.2 g. (97.4%). A mixed melting point with an authentic sample of the propylsulfuric acid showed no depression.

EXAMPLES 2–9

The procedure of Example 1 was followed in Examples 2–9, differing only in those details specified in the following table:

| Ex. | Sulfating Agent | Solvent | Temp., °C. | Moles sulfate/ Liter solvent | Percent yield |
|---|---|---|---|---|---|
| 2 | $SO_3$ | $CH_2Cl_2$ a | 5–15 | 1/1 | 94.2 |
| 3 | $SO_3$ | $CH_2Cl_2$ b | 40 | 1/1 | 94.8 |
| 4 | $SO_3$ | $CH_2Cl_2$ c | 5–15 | 1/1 | 92.4 |
| 5 | $SO_3$ | $C_2H_4Cl_2$ | 10–75 | 1/1 | 92.4 |
| 6 | $SO_3$ | $C_2H_4Cl_2$ | 25–83 | 3/1 | 80 |
| 7 | $SO_3$ | $C_2Cl_4$ | 25–80 | 1/1 | d 53 |
| 8 | $SO_3$ | $CH_2Cl_2$ e | 5–15 | 1/1 | d 57.5 |
| 9 | $SO_3$ | $CH_2Cl_2$ f | 5–15 | 1/1 | d 60.8 | a 4% lauryl pyridinum chloride added.
b 5% dimethyl formamide added.
c 5% dimethyl sulfoxide added.
d Product dissolved in water and converted directly to propylenimine.
e 10% water added.
f 1% water added.

EXAMPLE 10

Reaction of isopropanolamine and excess sulfur trioxide

The equipment described in Example 1 was employed for this experiment. 37.5 g. (0.5 mole) of isopropanolamine was added to 500 ml. of methylene chloride. To this was added 50 g. (0.625 mole) of sulfur trioxide. This corresponded to a 25% excess. The precipitate was not collected—but converted directly to propylenimine by adding water to the mixture (exotherm) separating and adding base to the aqueous layer. A 54% yield of propylenimine (by titration) was obtained. When this reaction was repeated, a 65% conversion to propylenimine was recorded.

EXAMPLE 11

Reaction of monomer sulfur trioxide and isopropanolamine

In a 3-neck, round bottom flask equipped with a stirrer, 3-way adapter, thermometer, condenser and drying tube, all of which had been dried at 100° C. and further flame dried while dry nitrogen was passed through them, was placed 500 ml. of dry distilled methylene chloride and 36.2 g. (0.47 mole) of dry distilled isopropanolamide. To this was added 37.6 g. (0.47 mole) of vapor sulfur trioxide. This was done by passing dry nitrogen into a dry, heated vacuum trap that contained a known amount of $SO_3$. The vapor sulfur trioxide then passed through a polytetrafluoroethylene tube into a gas inlet tube which led directly to the round bottom flask. Even though strenuous precautions had been taken against moisture, linear sulfur trioxide polymer formed on the inside of the gas inlet tube, plugging the reaction. This necessitated stopping the reaction and changing gas inlet tubes. The addition took six hours. The solid was filtered off and dried, first in a deciccator, at 25° C./5 mm. and then for 24 hours at 70° C./5 mm. The solid had turned slightly yellow and was still slightly oily. The yield was 72.7 g. (94%), M.P. 232–36°.

EXAMPLE 12

Separation of crude 1-amino-2-propylsulfuric acid 96.3 g. of crude 1-amino-2-propylsulfuric acid was separated into two portions. Portion 1 (38.6 g.) was converted to propylenimine. A 60% yield of imine by titration was experienced. Portion 2 (57.7 g.) was recrystallized from hot water. Only 32.8 g. (56.8%) of pure 1-amino-2-propylsulfuric acid was recovered, M.P. 253–6° (dec.). Also recovered on evaporation of the filtrate was 19.2 g. (33.3%) of a brown oil. The oil had the same spectra as the propylsulfuric acid. It was soluble in water, methanol, hot isopropanol, and insoluble in dioxane and acetonitrile.

Portion 2 (pure 1-amino-2-propylsulfuric acid) was converted to imine. An 88.3% yield was obtained. The unknown oil was also converted to imine and yields of 18.4% and 35.9% were recorded, as described in Example 13.

EXAMPLE 13

Conversion of unknown oil to propylenimine

The unknown oil obtained as residue from the recrystallization of crude 1-amino-2-propylsulfuric acid of Example 12 was divided into two portions. Portion 1 was converted directly to propylenimine. A conversion of 35.9% occurred. The second portion was heated in an oil bath at 160° C. and 0.1 mm. pressure for 24 hours and then converted to imine. A yield of 81.4% was obtained. After heating for 24 hours at 0.1 mm./160°, the oil had solidified, M.P. 234–36°. The infrared sepctra was the same as that of 1-amino-2-propylsulfuric acid.

EXAMPLE 14

Isomerization of crude 1-amino-2-propylsulfuric acid 77.5 g. (0.5 mole) of crude 1-amino-2-propylsulfuric acid, M.P. 239–240°, was converted to propylenimine in 39.5% yield by titration. Another 89.4 g. (0.576 mole) of the same substance was placed in a one liter round bottom flask and 400 ml. of mesitylene added. The mixture was refluxed for 48 hours. Soon after attaining reflux temperature, the solid melted to a brown oil which, on continued reflux, slowly solidified. The reaction was cooled and 78 g. of a brown solid of M.P. 240–241° was collected (87.2%). This solid had an IR spectrum identical with that of pure 1-amino-2-propylsulfuric acid. It was converted to propylenimine in the usual manner in 78.4% yield by titartion.

EXAMPLE 15

Isomerization of 2-hydroxypropylsulfamic acid

In a 250 ml. round bottom flask equipped with a condenser and drying tube was placed 2.1 g. (0.0135 mole) of freshly recrystallized 2-hydroxypropylsulfamic and 150 ml. of dry distilled mesitylene. The mixture was refluxed overnight during which time it had turned to an oil. The solvent was removed on a flash evaporator and the oil precipitated by the addition of acetone. A 100% yield of a light tan solid, M.P. 252–253° C., was obtained. This solid had the same spectrum as that of an authentic sample of 1-amino-2-propylsulfuric acid.

EXAMPLE 16

2-hydroxypropylsulfamic acid

To prove the structure of 2-hydroxypropylsulfamic acid and its isomerization to 1-amino-2-propylsulfonic acid, the sulfamic acid was synthesized and tested as follows:

A. Pyridine-sulfur trioxide complex: To a 1-liter, 3-neck flask, equipped with a 3-way adapater, stirrer, dropping funnel, thermometer, and condenser, was added 500 ml. of chloroform and 46.3 g. (0.40 mole) of chlorosulfonic acid. The mixture was cooled to 4° C., and slowly 63.2 g. (0.80 mole) of pyridine was added. The temperature was not allowed to go above 10° C. The total addition of pyridine took two hours. The mixture was stirred an additional hour and then filtered. The white precipitate was added to 600 g. of ice-water and triturated. The white solid was filtered, and dried for an hour, and then vacuum dried at room temperature—yield 41 g. (64.7%). The melting point was not determined as it varies with the composition of the complex. It has been reported in the range of 100–200° C.

B. Sodium-N-(2-hydroxypropyl)sulfamate: In a 1000 ml. 3-neck flask equipped with a stirrer, dropping funnel and 3-way adapter, was placed 520 ml. water and 44.6 g. (0.595 mole) of isopropanolamine. The pH was measured with a pH meter equipped with glass and calomel electrodes. The pH was 11.1. The pyridine-sulfur trioxide complex of "A" herein was added in small portions. The pH was kept between 10.8 and 11.1 by the gradual addition of 10% sodium hydroxide solution. A total of 75 g. (0.475 mole) of pyridinesulfur trioxide was added. After the complex had dissolved, the pyridine was azeotroped off at reduced pressure. The remaining liquid (180 ml.) was added to 600 ml. of ethanol and filtered. The ethanol-water mixture was now added to 1500 ml. of acetone. A white solid fell out of solution. This was air dried. Yield, 51.74 g. (61.6%), M.P. 166–9°. Recrystallization from abs. alcohol, M.P. 168–9°. The solid, sodium-N-(2-hydroxypropylsulfamate, was soluble in water and basic to litmus. It was insoluble in acetone.

C. N-2-hydropropylsulfamic acid: 1 g. of sodium-N-(2-hydroxy)propyl sulfamate of "B" herein was dissolved in 15 ml. of water and chromatographed over Dowex 50W–X8, a strongly acidic cationic exchange resin. The resin was washed with 250 ml. of water which was evaporated to dryness in a flash evaporator. Collected was 0.63 g. (71.8%) of a white solid, M.P. 132–133.5°. This was purified by dissolving in warm acetone and precipitating with ether, M.P. 138–9°, of N - 2 - hydroxypropylsulfamic acid.

D. Isomerization of 2-hydroxypropylsulfamic acid: A small amount of 2-hydroxypropylsulfamic acid of "C" herein, M.P. 137–9°, was placed in a test tube and heated in an oil bath at 150–160° C. After three minutes, the solid partially melted and then resolidified. After 30 minutes, the tube was cooled. The M.P. had risen to 225–231° C. The infrared spectrum indicated partial conversion to 1-amino-2-propylsulfuric acid. The test tube was reheated for 2 more hours and again cooled. M.P. 241–44° C. The infrared spectrum showed complete conversion to the 1-amino-2-propylsulfuric acid. Finally, the tube was heated at 160° C. for four more hours, cooled and a melting point of 241–44° C. obtained.

EXAMPLE 17

Preparation of propylenimine

To a 1 liter, 3-neck flask equipped with a stirrer, dropping funnel, distilling head, thermometer and condenser set for distillation, was added 155 g. (1.0 mole) of 1-amino-2-propylsulfuric acid of melting point 245–5°, and 620 ml. of water (20% solution). The mixture was stirred until the propylsulfuric acid dissolved. Slowly, 88 g. (2.4 moles) of sodium hydroxide was added. After this addition, the reaction was heated until distillation occurred: 315 ml. of distillate was collected, and a 1 ml. titer of distillate assayed for propylenimine. A 63.2% yield of propylenimine was obtained. The propylenimine was now collected by salting out with 50% caustic by weight followed by sodium hydroxide pellets. 32 g. (57.9%) of propylenimine was collected.

Following the procedure of Example 1, and using the corresponding 2-hydroxyalkylamine in place of isopropanolamine the following 1-amino-2-alkylsulfuric acids are prepared:

1-amino-2-ethylsulfuric acid
1-amino-2-butylsulfuric acid
1-amino-2-pentylsulfuric acid
1-amino-2-hexylsulfuric acid
1-amino-2-octylsulfuric acid As many embodiments of this invention may be made without departing from the spirit and scope thereof, it is to be understood that the invention includes all such modifications and variations as come within the scope of the appended claims.

What is claimed is:

1. The process for preparing 1-amino-2-alkylsulfuric acids comprising reacting at a temperature between 0° C. and 15° C. a 2-hydroxyloweralkylamine having the formula

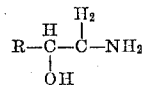

wherein R is an alkyl group having 1–6 carbon atoms, with liquid sulfur trioxide, in a solvent which is liquid at the reaction temperature.

2. The process of claim 1 wherein said solvent is a chlorinated hydrocarbon.

3. The process of claim 1 wherein said solvent is selected from the group consisting of methylene chloride, ethylene chloride, tetrachloroethylene, trichloroethylene, chloroform, carbon tetrachloride, chlorobenzene and nitrobenzene.

4. The process of claim 3 wherein said solvent is methylene chloride.

5. The process for preparing 1-amino-2-propylsulfuric acid comprising reacting at a temperature between 0° C. and 15° C. sulfur trioxide with isopropanolamine, in a chlorinated hydrocarbon solvent which is liquid at the reaction temperatures, to form 1-amino-2-propylsulfuric acid.

6. The process of claim 5 wherein said solvent is selected from the group consisting of methylene chloride, ethylene chloride, tetrachloroethylene, and trichloroethylene.

7. The process of claim 6 wherein said solvent is methylene chloride.

8. The process of claim 6 wherein said solvent is ethylene chloride.

9. The process of claim 6 wherein said solvent is tetrachloroethylene.

References Cited

UNITED STATES PATENTS 2,966,518  12/1960  Johnson _____ 260—458 X
3,153,079  10/1964  Forshaw _____ 260—458
3,169,143  2/1965   Gavlin et al. _____ 260—458

OTHER REFERENCES

Groggins: "Unit Process in Organic Synthesis," 5th ed., pp. 309–310 (1958).

CHARLES B. PARKER, *Primary Examiner.*

B. BILLIAN, L. C. MARUZO, *Assistant Examiners.*